US006910030B2

(12) United States Patent
Choi et al.

(10) Patent No.: US 6,910,030 B2
(45) Date of Patent: Jun. 21, 2005

(54) ADAPTIVE SEARCH METHOD IN FEATURE VECTOR SPACE

(75) Inventors: Yang-lim Choi, Suwon (KR); Youngsik Huh, Suwon (KR); B. S. Manjunath, Santa Barbara, CA (US); Peng Wu, Santa Barbara, CA (US)

(73) Assignees: Samsung Electronics Co., Ltd., Tokyo (JP); The Regents of the University of California, Oakland, CA (US)

( * ) Notice: Subject to any disclaimer, the term of this patent is extended or adjusted under 35 U.S.C. 154(b) by 348 days.

(21) Appl. No.: 09/783,149

(22) Filed: Feb. 15, 2001

(65) Prior Publication Data

US 2002/0059194 A1 May 16, 2002

Related U.S. Application Data

(60) Provisional application No. 60/248,012, filed on Nov. 14, 2000.

(30) Foreign Application Priority Data

Dec. 20, 2000 (KR) ........................................ 2000-79181

(51) Int. Cl.[7] .............................................. G06F 17/30
(52) U.S. Cl. ............................... 707/3; 707/2; 707/102; 707/104.1; 706/13; 706/19
(58) Field of Search ............................... 707/2, 3, 5, 6, 707/100, 102, 104.1; 706/13, 19, 46, 59; 715/500

(56) References Cited

U.S. PATENT DOCUMENTS 5,647,058 A     7/1997  Agrawal et al.
5,710,916 A  *  1/1998  Barbara et al. ................. 707/9
6,122,628 A  *  9/2000  Castelli et al. ................. 707/5
6,411,953 B1 *  6/2002  Ganapathy et al. ............ 707/6
6,438,566 B1 *  8/2002  Okuno et al. ................ 715/512

FOREIGN PATENT DOCUMENTS

| EP | 0 942 380 A | 9/1999 |
| JP | 8-249352 | 9/1996 |
| JP | 8-249352 A | 9/1996 |
| JP | 9-34909 A | 2/1997 |
| JP | 9-34909 | 2/1997 |

OTHER PUBLICATIONS

Yoshinori Musha, et al. "A User Interface Visualizing Feature Space for Content–Based Image Retrieval" The Institute of Electronics Information and Communication Engineers, Technical Report of IEICE.IE98–49,PRMU98–72, MVE98–72 Jul. 1998.

* cited by examiner

*Primary Examiner*—Shahid Alam
*Assistant Examiner*—Fred Ehichioya
(74) *Attorney, Agent, or Firm*—Sughrue Mion, PLLC

(57) ABSTRACT

An adaptive search method in feature vector space which can quickly search the feature vector space indexed based on approximation for a feature vector having features similar to a query vector according to a varying distance measurement is provided. The adaptive search method includes the steps of (a) performing a similarity measurement on a given query vector within the feature vector space, and (b) applying search conditions limited by the result of the similar measurement obtained in the step (a) and performing a changed similarity measurement on the given query vector. According to the adaptive search method, the number of candidate approximation regions is reduced during a varying distance measurement such as an on-line retrieval, which improves the search speed.

7 Claims, 3 Drawing Sheets

FIG. 2

Begin initialize $\Phi$ count=0;

for i=1 to N compute $L_i(W_{t+1})$ and $U_i(W_{t+1})$ for $P_i$

202 —— if $L_i(W_{t+1}) \leq r^u_{t+1}$ and $L_i(W_{t+1}) \leq \Phi^u_{t+1}$ and $L_i(W_{t+1}) \leq \Phi$ 206 —— update $\Phi$ 204 —— choose $P_i$ end for $N_1$ = count End

ADAPTIVE SEARCH METHOD IN FEATURE VECTOR SPACE

This application is a complete application filed under 35 U.S.C §111 (a) and claims, pursuant to 35 U.S.C. §119 (e)(1), benefit of the filing date of Provisional Application Ser. No. 60/248,012 filed Nov. 14, 2000 pursuant to 35 U.S.C. §111 (b). The Provisional Application Ser. No. 60/248,012 is incorporated herein by reference. Additionally, this application claims priority from Korean Application No. 00-79181 filed Dec. 20, 2000, which is also incorporated herein by reference.

BACKGROUND OF THE INVENTION

1. Field of the Invention

The present invention generally relates to a method of searching a feature vector space for a feature vector that has similar features to a query vector. More specifically, the method of the present invention provides a method for efficiently searching a vector space indexed based on an approximation for a feature vector having features similar to a query vector according to a varying distance measurement.

2. Description of the Related Art

In a multimedia database related to a multimedia application, the contents are typically represented by feature vectors. Similarities among objects are determined by a distance measurement defined by feature distances between the query vector and feature vectors in a feature vector space.

To provide further precise retrievals, a distance measurement may be iteratively performed using collected information such as user feedback. However, a conventional search method does not consider how to iteratively perform a distance measurement according to varying factors in a large database. In particular, a conventional indexing, method in a feature vector space has not addressed how to quickly perform a search in an environment where a distance measurement is changing, such as on-line retrieval. Thus, there still remains a need for accelerating, a search in an environment where a distance measurement is varying.

SUMMARY OF THE INVENTION

To solve the above problems, it is an objective of the present invention to provide a method for quickly and iteratively searching an approximated feature vector space for a feature vector similar to a query vector according to varying measurement conditions.

Accordingly, to achieve the above objective, the present invention provides a method for adaptively searching a feature vector space which includes the steps of (a) performing a similarity measurement on a given query vector within a feature vector space, and (b) applying search conditions limited by the result of the similarity measurement obtained in step (a) and performing a changed similarity measurement on the glen query vector.

Preferably, step (b) includes the steps of (b-1) obtaining candidate approximation regions by performing approximation level filtering according to a distance measurement limited by the result of the similar measurement obtained in step (a), and (b-2) performing data level filtering on the obtained candidate approximation regions.

Preferably, step (a) includes the steps of (a-1) obtaining a predetermined number of nearest candidate approximation regions by measuring the distance between the query vector and approximation regions, and (a-2) obtaining K nearest neighbor feature vectors by measuring the distance between each of all feature vectors in the obtained candidate approximation regions and the query vector, where K is a positive integer.

Preferably, step (b-1) includes the steps of (b-1-1) calculating K'-th shortest distance for the K nearest neighbor feature vectors obtained according to the previous distance measurement according to a changed distance measurement, where K' is a positive integer, and setting the calculated distance as $r''_{i+1}$, and (b-1-2) calculating K'-th smallest lower bound limit for the predetermined number of candidate approximation regions based on the previous distance measurement according to the changed distance measurement and set as $\phi''_{t-1}$.

Preferably, step (b-1) also includes the following steps of: (b-1-3a) measure a distance $L_i(W_{t+1})$ between the lower bound limit of an approximation region and a query vector for a new distance measurement, wherein N is a positive integer denoting the number of objects in the feature vector space and i is a variable ranging from 1 to N: (b-1-4) comparing the distance $L_i(W_{t+1})$ obtained in the step (b-1-3a) with a minimum value min ($\Phi$, $r''_{t+1}$, $\phi''_{t+1}$) of K-th smallest upper bound limit $\Phi$, $r''_{t+1}$, and $\phi''_{t+1}$: and (b-1-5) if the distance $L_i(W_{t+1})$ is less than or equal to the minimum value min ($\Phi$,$r''_{t+1}$, $\phi''_{t+1}$), setting the corresponding approximation region as a candidate approximation region: and (b-1-6) if the distance $L_i(W_{t+1})$ is greater than the minimum value min ($\Phi$, $r''_{t+1}$, $\phi''_{t+1}$), excluding the corresponding approximation region.

Additionally, step (b-1) further includes (b-1-3b) measuring a distance $U_i(W_{t+1})$ between the upper bound limit of an approximation region and the query vector for the new distance measurement, assuming that N is a positive integer denoting the number of objects in the feature vector space and i is a variable ranging from 1 to N, and (b-1-7) updating the K-th smallest upper bound limit $\Phi$ based on the distance $U_i(W_{t-1})$.

Furthermore, steps (b-1-1)-(b-1-6) are repeated until the approximation level filtering is performed on N approximation regions where N is a positive integer denoting the number of objects in a database.

Preferably, step (b-2) further includes the steps of (b-2-1) performing a distance measurement between each of all feature vectors in the candidate approximation regions and the query vector, and (b-2-2) determining K' nearest neighbor feature vectors as retrieved vectors depending on the result of the distance measurements performed in the step (b-2-1).

BRIEF DESCRIPTION OF THE DRAWINGS

The above objective and advantages of the present invention will become more apparent by describing in detail preferred embodiments thereof with reference to the attached drawings in which:

FIG. 2 is a pseudo code list for explaining approximation level filtering.

DETAILED DESCRIPTION OF THE INVENTION

Figure 1A:
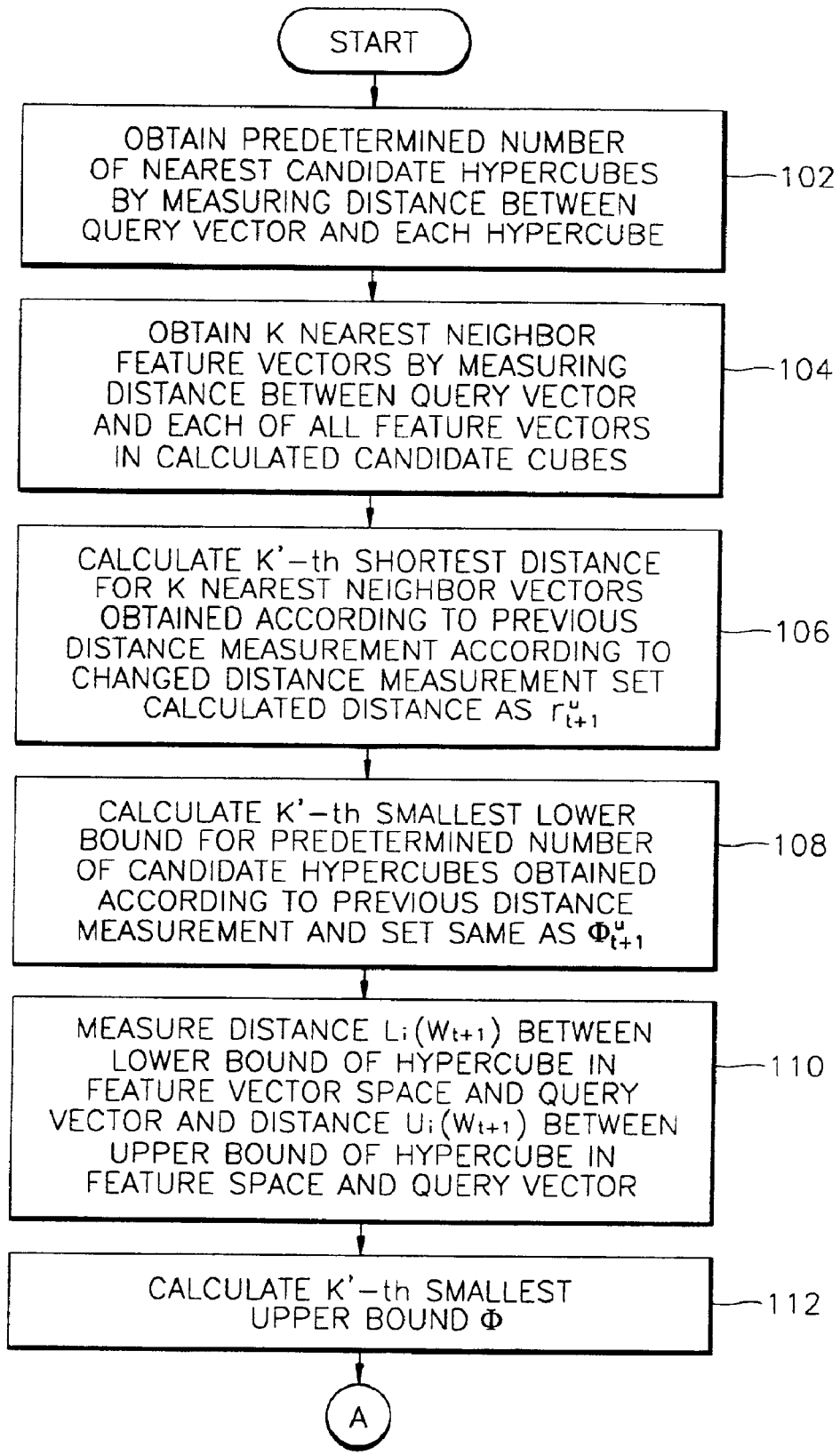
FIGS. 1A and 1B are flowcharts showing main steps of a method for adaptively searching a feature vector space according to an embodiment of the present invention.
Figure 1B:
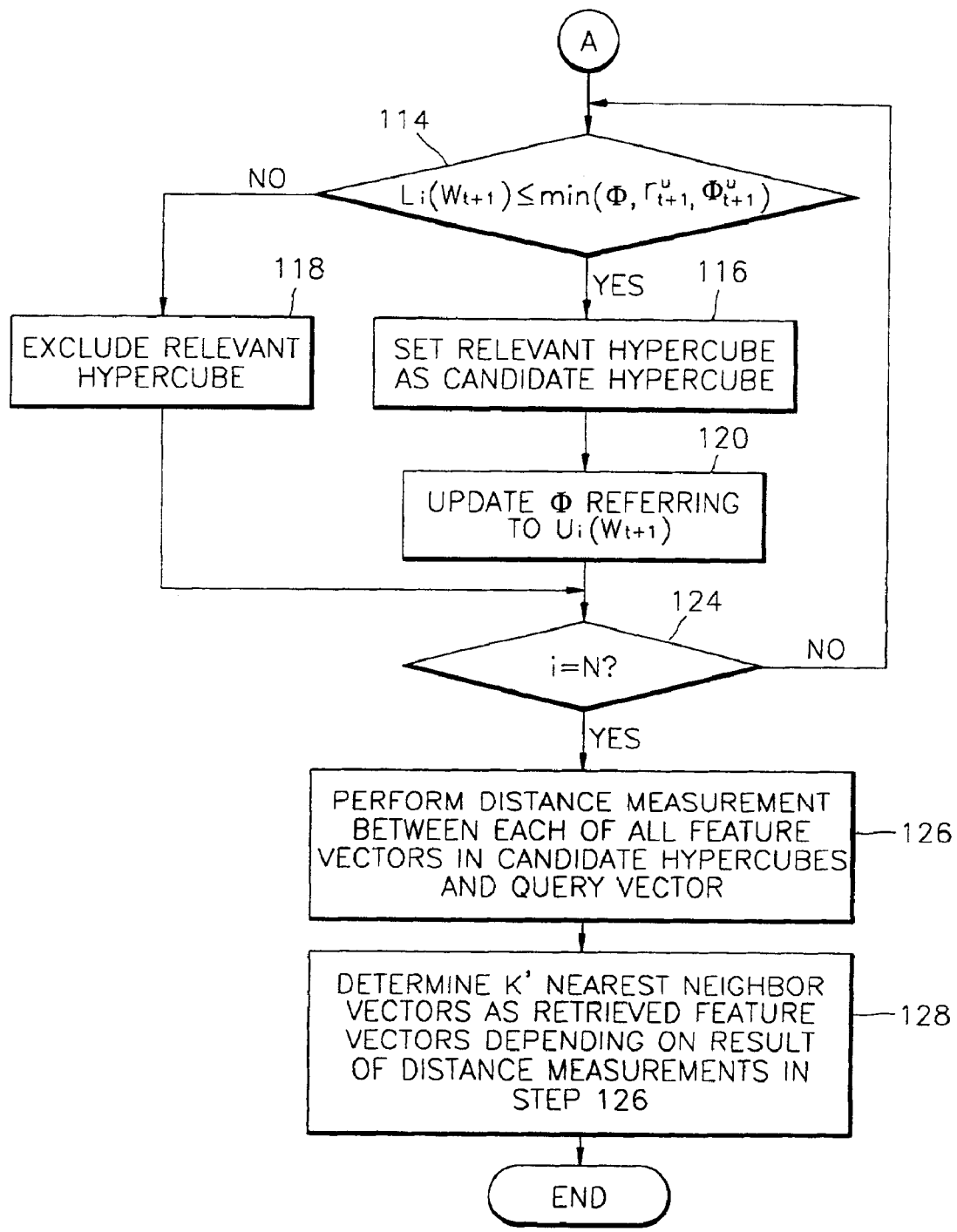

The main steps of an adaptive search method according to an embodiment of the present invention will now be described with reference to FIGS. 1A and 1B. A database in which multimedia contents are stored is represented as a feature vector space. In this embodiment, the feature vector space is approximated with a plurality of hypercubes. Furthermore, assuming that M is a positive integer denoting the dimensionally of feature vectors used to describe an image/video object, and N is a positive integer denoting the number of objects in the database, feature vector $\overline{F}$ and feature vector $\overline{Q}$ of a query object Q are defined as $\overline{F}=[F_{i1}, F_{i2}, \ldots F_{im}]$ and $\overline{Q}=[q_{i1}, q_{i2}, \ldots, q_{im}]$, respectively. Here the database is represented as a feature vector space and the feature vector $\overline{Q}$ of a query object Q is hereinafter called a query vector.

First, a predetermined number of nearest candidate hypercubes are obtained by measuring the distance between a query vector and each of hypercubes (step 102). Then, K of nearest neighbor feature vectors are obtained by measuring the distance between the query vector and each feature vector in the predetermined number of candidate hypercubes obtained in the step 102, where K is a positive integer (step 104). The distance between the query vector and each of the feature vectors is measured by calculating weighted Euclidean distance. The weighted Euclidean distance is calculated by Equation (1):

$$d(W_t, \overline{F}_i, \overline{Q}) = (\overline{Q}-\overline{F})^T W_t (\overline{Q}-\overline{F}) \qquad (1)$$

where $W_t$ is a full symmetric function matrix at iteration t and updated at every iteration.

Then, for example, the user selects a plurality of multimedia contents similar to those that he or she desires to find among calculated multimedia contents and attempts a search again. Thus, feedback for changed search conditions can be provided from the user, which is called relevance feedback. According to the present intention, features for which feedback is provided from the user are reflected in a distance measurement for the next search, thereby changing distance measurement conditions.

According to the present invention, approximation level filtering is performed using, information from previous iteration t, $W_t, C_f(W_t)$, and $R_t$ denote a distance measurement function used in the previous iteration t, approximation regions that passed the previous iteration t or hypercubes in this embodiment and vectors retrieved using $W_t$, respectively.

FIG. 2 shows a pseudo code list for explaining the step of approximation level filtering. The approximation level filtering is performed using the information from the previous iteration t. Referring to FIG. 2, according to the pseudo codes, during the approximation level filtering, the K'-th shortest distance is calculated for the K nearest neighbor feature vectors based on the previous distance measurement according to the changed distance measurement where K' is a positive integer, and the calculated distance is set as $r''_{t+1}$ (step 106). Furthermore, K'-th smallest lower bound limit is calculated for the predetermined number of candidate hypercubes obtained according to the previous distance measurement according to the changed distance measurement and set as $\phi''_{t+1}$ (step 108).

Then, the distance $L_i(W_{t+1})$ between each of the lower bound limits of hypercubes in the feature vector space and a query vector are measured according to the changed new distance measurement. Additionally, the distance $U_i(W_{t+1})$ between each of the upper bound limits of the hypercubes in the feature vector space and the query vector are measured according to the changed new distance measurement as well (step 110). The measurements are done assuming that N is the number of objects or approximation regions in the approximated feature vector space or a positive integer denoting the number of hypercubes. Additionally, i is assumed to be a variable ranging from 1 to N. Furthermore, the K'-th smallest upper bound limit $\Phi$ is calculated (step 112).

Next, the distance $L_i(W_{t+1})$ between the lower bound limit of i-th hypercube in the corresponding vector space and the query vector is compared with a minimum value min ($\Phi$, $r''_{t+1}$, $\phi''_{t+1}$) of the K'-th smallest upper bound limit $\Phi$ calculated in the step 112, $r''_{t+1}$ (step 114). If the distance $L_i(W_{t+1})$ is less than or equal to the minimum value min ($\Phi$, $r''_{t+1}$, $\phi''_{t+1}$), a relevant hypercube is set as a candidate hypercube (step 116) and if not, the relevant hypercube is excluded (step 118).

Referring to pseudo code 202 in FIG. 2, it is determined whether or not the distance $L_i(W_{t+1})$ between the lower bound limit of i-th hypercube in the corresponding vector space and the query vector is smaller than all of the K'-th smallest upper bound limits $\Phi$, $r''_{t+1}$, and $\phi''_{t+1}$. If so, the relevant hypercube $P_i$ is selected as a candidate hypercube as shown pseudo code 204. Referring to pseudo code 206. If requirements shown in the pseudo code 202 are satisfied, the relevant hypercube $P_i$ is selected as a candidate hypercube, and the upper bound limit $\Phi$ is updated referring to the distance $U_i(W_{t+1})$ (step 120).

Next, assuming that N is a positive integer denoting the number of objects in the database or hypercubes, it is determined whether i reaches N (step 124). If i does not reach N, the steps 114–124 are repeated until the approximation level filtering is performed on N hypercubes.

According to the method described above, for a hypercube to be set as a candidate hypercube, the hypercube must meet new requirements determined from the previous distance measurement information such as the pseudo code 202. Thus, requirements for selecting candidate hypercubes are further limited, thereby reducing the number of selected candidate hypercubes.

Data level filtering is then performed. During the filtering, a distance measurement between each of all feature vectors in the candidate hypercubes and the query vector is performed (step 126) to determine K' nearest neighbor vectors as found feature vectors depending on the result of the distance measurements performed in the step 126, thereby completing a search (step 128). In this case, the number of candidate hypercubes is reduced, which reduces the computational complexity in measuring the distance between each feature vectors in the candidate cubes and the query vector. Thus, the search speed can be improved when searching for a feature vector having features similar to a query vector. Additionally, if new approximation regions are included, the database can be updated faster.

Although the preferred embodiments of this invention has been described with reference to the example that the feature vector space is partitioned into hypercubes and approximated, the invention is also applicable to feature vector spaces indexed by other known index structures such as R-tree, R* tree, SR-tree and X-tree. It will be understood by those skilled in the art that various changes in form and details may be made therein without departing from the spirit and scope of the invention as defined by the appended claims.

The search method according to the present invention can be written as a program executed on a personal or server computer. The program codes and code segments constructing the program can be easily inferred by computer programmers in the industry. Furthermore, the program can be stored in a computer-readable recording medium. The recording medium includes a magnetic recording medium, an optical recording medium, and a radio medium.

According to the present invention, the number of approximation regions is reduced during a varying distance measurement, which improves a search speed.

What is claimed is:

1. A method for adaptively searching a feature vector space, the method comprising the steps of:
   (a) performing a similarity measurement on a given query vector within the feature vector space; and
   (b) applying search conditions limited by the result of the similarity measurement obtained in the step (a) and performing a changed similarity measurement on the given query vector,
   wherein the step (b) further comprises the sub-steps of:
   (b-1) obtaining candidate approximation regions by performing approximation level filtering according to a distance measurement limited by the result of the similar measurement obtained in the step (a); and
   (b-2) performing data level filtering on obtained candidate approximation regions and wherein step (a) comprises the sub-steps of:
   (a-1) obtaining a predetermined number of nearest candidate approximation regions by measuring the distance between the query vector and each approximation region; and
   (a-2) obtaining K nearest neighbor feature vectors by measuring the distances between all feature vectors in the obtained candidate approximation regions and the query vector, where K is a positive integer.

2. The method of claim 1, wherein the step (b-1) comprises the steps of:
   (b-1-1) calculating a K'-th shortest distance for said plurality of K nearest neighbor feature vectors obtained by said second plurality of distance measurements according to a changed distance measurement where K' is a positive integer, and setting a calculated distance as $r''_{t+1}$; and
   (b-1-2) calculating K'-th smallest lower bound limit for said plurality of predetermined number of nearest candidate approximation regions obtained by said first plurality of distance measurements according to said changed distance measurement and set as $\phi''_{t+1}$.

3. The method of claim 2, wherein the step (b-1) further comprises the steps of:
   (b-1-3a) measuring a distance $L_i(W_{t+1})$ between said lower bound limit of at least one said nearest candidate approximation region and said query vector to determine a first new distance measurement, wherein N is a positive integer denoting the number of objects in the feature vector space and i is a variable ranging from 1 to N;
   (b-1-4) comparing the distance $L_i(W_{t+1})$ obtained in the step (b-1-3a) with a minimum value min $(\Phi, r''_{t+1}, \phi''_{t+1})$ of K-th smallest upper bound limit $\Phi$, $r''_{t+1}$, and $\phi''_{t+1}$; wherein
   (b-1-5) if the distance $L_i(W_{t+1})$ is less than or equal to the minimum value min $(\Phi, r''_{t+1}, \phi''_{t+1})$ setting a corresponding approximation region as a new candidate approximation region; and
   (b-1-6) if the distance $L_i(W_{t+1})$ is greater than the minimum value min $(\Phi, r''_{t+1}, \phi''_{t+1})$, excluding the corresponding approximation region.

4. The method of claim 3, wherein the step (b-1) further comprises the steps of: (b-1-3b) measuring a distance $U_i(W_{t+1})$ between the upper bound limit of at least one said nearest candidate approximation region and the query vector for a second new distance measurement, assuming that N is a positive integer denoting the number of objects in the feature vector space and i is a variable ranging from 1 to N;
   (b-1-7) updating the K-th smallest upper bound limit $\Phi$ based on the distance $U_i(W_{t+1})$.

5. The method of claim 4, wherein the steps of (b-1-1)-(b-1-6) are repeated until the approximation level filtering is performed on all said candidate approximation regions in a database, wherein all the candidate approximation regions in said database is denoted by a positive integer (N), which represents a number of objects in said database.

6. The method of claim 3, wherein the steps of (b-1-1)-(b-1-6) are repeated until the approximation level filtering is performed on all said candidate approximation regions in a database, wherein all the candidate approximation regions in said database is denoted by a positive integer (N), which represents a number of objects in said database.

7. The method of claim 1, wherein the step (b-2) comprises the steps of:
   (b-2-1) performing a third distance measurement between each of all feature vectors in said plurality of nearest candidate approximation regions and the query vector; and
   (b-2-2) determining K' nearest neighbor feature vectors as retrieved vectors depending on the result of said third distance measurements performed in the step (b-2-1).

* * * * *